(12) United States Patent
Tsai

(10) Patent No.: US 8,912,782 B2
(45) Date of Patent: Dec. 16, 2014

(54) DC-TO-DC CONVERTER

(75) Inventor: Chih-Chang Tsai, Taoyuan County (TW)

(73) Assignees: FSP Technology Inc., Taoyuan County (TW); 3Y Power Technology (Taiwan), Inc., Taoyuan County (TW)

( * ) Notice: Subject to any disclaimer, the term of this patent is extended or adjusted under 35 U.S.C. 154(b) by 260 days.

(21) Appl. No.: 13/025,159

(22) Filed: Feb. 11, 2011

(65) Prior Publication Data

US 2011/0199064 A1  Aug. 18, 2011

(30) Foreign Application Priority Data

Feb. 12, 2010  (TW) ................ 99104805 A

(51) Int. Cl.
*H02M 3/158* (2006.01)
*H02M 1/00* (2006.01)

(52) U.S. Cl.
CPC ........ *H02M 3/158* (2013.01); *H02M 2001/007* (2013.01)
USPC ........................................ 323/285; 323/259

(58) Field of Classification Search
CPC ...................................................... H02M 3/158
USPC ......... 323/282, 283, 284, 285, 210, 222, 225, 323/259, 271, 235, 319, 233; 363/21.06, 363/20, 16
See application file for complete search history.

(56) References Cited

U.S. PATENT DOCUMENTS

| | | | |
|---|---|---|---|
| 5,475,296 A * | 12/1995 | Vinsant et al. | 323/223 |
| 5,612,609 A * | 3/1997 | Choi | 323/210 |
| 7,511,437 B2 * | 3/2009 | Lys et al. | 315/307 |
| 2004/0165403 A1 * | 8/2004 | Crawford | 363/17 |
| 2008/0151582 A1 * | 6/2008 | Schlecht | 363/21.06 |
| 2008/0303502 A1 * | 12/2008 | Haiplik | 323/283 |

* cited by examiner

*Primary Examiner* — Gary L Laxton
*Assistant Examiner* — Trinh Dang
(74) *Attorney, Agent, or Firm* — Jianq Chyun IP Office

(57) ABSTRACT

A DC-to-DC converter adapted for generating a power voltage required by a load and including a buck circuit and a boost circuit is provided. The buck circuit is used for receiving a DC input voltage, and outputting the power voltage by performing a buck process to the DC input voltage, or directly outputting the DC input voltage according to a first control signal. The boost circuit is used for receiving the power voltage or the DC input voltage both output from the buck circuit, and outputting the power voltage to the load by performing a boost process to the DC input voltage output from the buck circuit, or directly outputting the power voltage output from the buck circuit to the load according to a second control signal.

17 Claims, 2 Drawing Sheets

DC-TO-DC CONVERTER

CROSS-REFERENCE TO RELATED APPLICATION

This application claims the priority benefit of Taiwan application serial no. 99104805, filed on Feb. 12, 2010. The entirety of the above-mentioned patent application is hereby incorporated by reference herein and made a part of this specification.

BACKGROUND OF THE INVENTION

1. Field of the Invention

The present invention relates to a power supply device, more particularly, to a direct current (DC)-to-DC converter having a boost/buck function and high efficiency.

2. Description of Related Art

Conventionally, to stably and accurately provide a power voltage required by a load (for example, an electronic device), a direct current (DC)-to-DC converter is generally designed to have a boost/buck function. FIG. 1 is a circuit schematic diagram illustrating a conventional DC-to-DC converter 100 having the boost/buck function. Referring to FIG. 1, the DC-to-DC converter 100 includes a transformer TX having an isolation function, a switch SW, a capacitor C, a diode D and a voltage feedback controller VF.

Generally, the voltage feedback controller VF continually detects a power voltage Vpwr received by a load LD, and accordingly generates a control signal CS with a variable duty cycle, so as to boost or buck a DC input voltage Vin. In this way, the DC-to-DC converter 100 can stably/accurately provide the power voltage Vpwr required by the load LD.

However, since the DC-to-DC converter 100 simultaneously achieves the boost and the buck functions mainly through the transformer TX having the isolation function, the transformer TX has to burden all of the output power, so that a size of the transformer TX would be very large, and efficiency thereof is relatively low. Therefore, the DC-to-DC converter 100 is hard to be implemented in a miniaturized electronic device.

SUMMARY OF THE INVENTION

Accordingly, the present invention is directed to a direct current (DC)-to-DC converter having a boost/buck function, a small size and a high efficiency.

Additional aspects and advantages of the present invention will be set forth in the description of the techniques disclosed in the present invention.

To achieve one of or all aforementioned and other advantages, the present invention provides a DC-to-DC converter adapted for generating a power voltage required by a load, and the DC-to-DC converter includes a buck circuit and a boost circuit. The buck circuit is used for receiving a DC input voltage, and performing a buck process to the DC input voltage according to a first control signal to output the power voltage, or directly outputting the DC input voltage according to the first control signal. The boost circuit is coupled to the load and the buck circuit, and is used for receiving the power voltage or the DC input voltage output from the buck circuit, and performing a boost process to the DC input voltage output from the buck circuit according to a second control signal to output the power voltage to the load, or directly outputting the power voltage output from the buck circuit to the load according to the second control signal.

In an embodiment of the present invention, the DC-to-DC converter further includes a control unit. The control unit is coupled to the buck circuit and the boost circuit and is used for detecting output voltages of the buck circuit and the boost circuit, so as to generate the first control signal and the second control signal to control the buck circuit and the boost circuit.

In an embodiment of the present invention, when the DC input voltage is higher than the power voltage, the control unit controls the buck circuit to perform the buck process to the DC input voltage to output the power voltage, and controls the boost circuit to directly output the power voltage output from the buck circuit to the load.

In an embodiment of the present invention, when the DC input voltage is lower than the power voltage, the control unit controls the buck circuit to directly output the DC input voltage, and controls the boost circuit to perform the boost process to the DC input voltage output from the buck circuit, so as to output the power voltage to the load.

In an embodiment of the present invention, an output power of the boost circuit is less than, greater than or equal to an output power of the buck circuit.

According to the above descriptions, in the DC-to-DC converter of the present invention, the buck circuit and the boost circuit are independently designed, and are used in collaboration to achieve purposes of boost/buck function, small size and high efficiency, etc. To be more specific, in case that the DC input voltage is higher than the power voltage required by the load, since only the buck circuit performs the buck process to generate the power voltage required by the load, and the boost circuit just transmits the power voltage generated by the buck circuit to the load, the DC-to-DC converter can achieve the buck function and achieve a purpose of improving a buck efficiency.

On the other hand, in case that the DC input voltage is lower than the power voltage required by the load, since the buck circuit just transmits the received DC input voltage, and only the boost circuit performs the boost process to generate the power voltage required by the load, the DC-to-DC converter can achieve the boost function and achieve a purpose of improving a boost efficiency. Moreover, if the output power of the boost circuit is designed to be far less than the output power of the buck circuit, a size of a transformer applied in the boost circuit can be greatly reduced, so as to miniaturize a size of the DC-to-DC converter.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
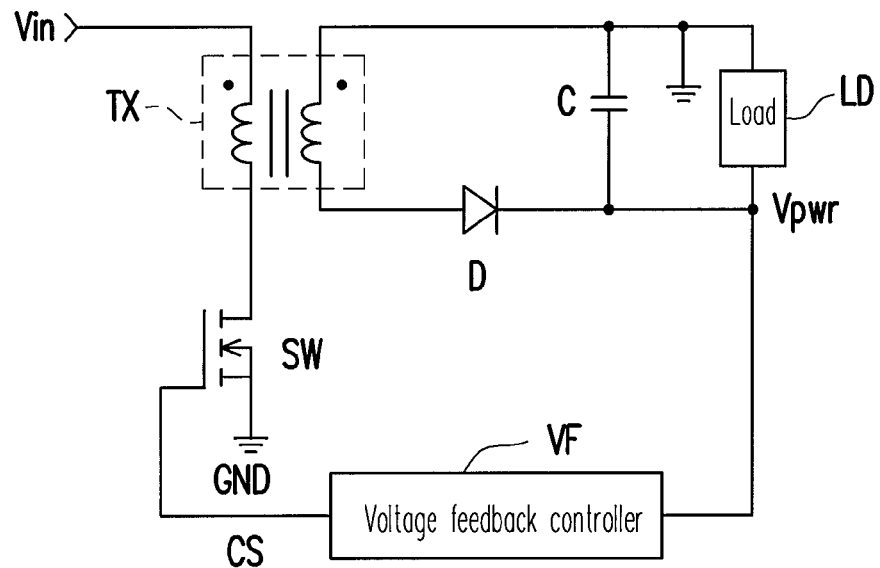
FIG. 1 is a circuit schematic diagram illustrating a conventional direct current (DC)-to-DC converter having a boost/buck function.

The present invention will now be described more fully with reference to the accompanying drawings, in which exemplary embodiments of the invention are shown. Moreover, reference will now be made in detail to the present preferred embodiments of the invention, examples of which are illustrated in the accompanying drawings. Wherever possible, the same reference numbers are used in the drawings and the description to refer to the same or like parts.

Figure 2:
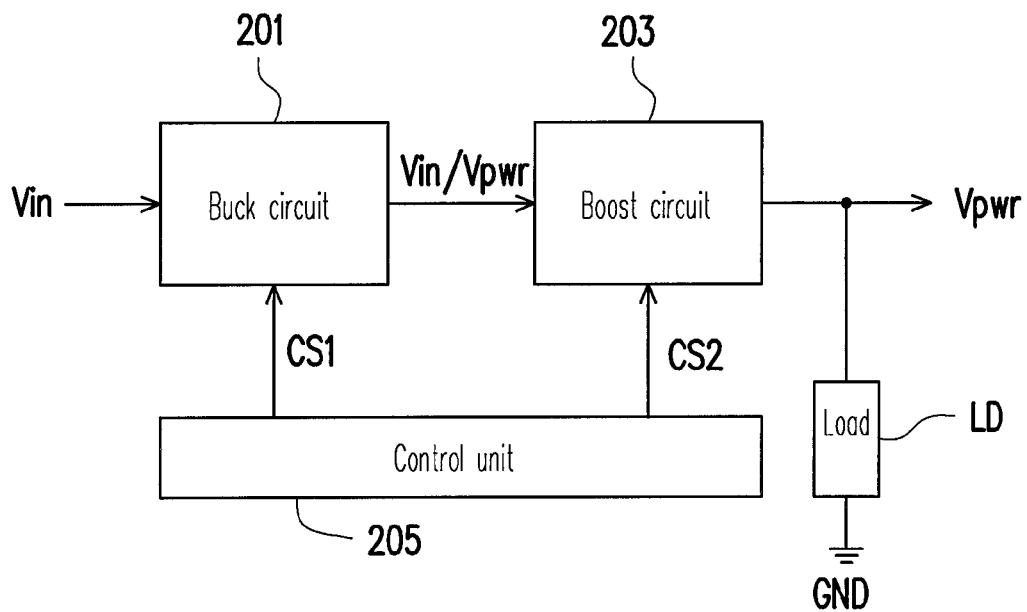
FIG. 2 is a block schematic diagram illustrating a DC-to-DC converter according to an embodiment of the present invention.

FIG. 2 is a block schematic diagram illustrating a direct current (DC)-to-DC converter 200 according to an embodiment of the present invention. Referring to FIG. 2, the DC-to-DC converter 200 is adapted for generating a power voltage Vpwr required by a load LD (for example, and electronic device, though the present invention is not limited thereto), and the DC-to-DC converter 200 includes a buck circuit 201, a boost circuit 203, and a control unit 205. In the present invention, an output power of the boost circuit 203 can be less than, greater than or equal to an output power of the buck circuit 201, which is determined according to an actual design requirement.

The buck circuit 201 receives a DC input voltage Vin, and performs a buck process to the DC input voltage Vin according to a first control signal CS1 to output the power voltage Vpwr, or directly outputs the DC input voltage Vin according to the first control signal CS1. The boost circuit 203 is coupled to the load LD and the buck circuit 201. The boost circuit 203 is used for receiving the power voltage Vpwr or the DC input voltage Vin output from the buck circuit 201, and performing a boost process to the DC input voltage Vin output from the buck circuit 201 according to a second control signal CS2 so as to output the power voltage Vpwr to the load LD, or directly outputting the power voltage Vpwr output from the buck circuit 201 to the load LD according to the second control signal CS2.

The control unit 205 is coupled to the buck circuit 201 and the boost circuit 203, and is used for detecting output voltages of the buck circuit 201 and the boost circuit 203, so as to generate the first control signal CS1 and the second control signal CS2 for controlling the buck circuit 201 and the boost circuit 203. In the present embodiment, when the DC input voltage Vin is higher than the power voltage Vpwr, the control unit 205 controls the buck circuit 201 to perform the buck process to the DC input voltage Vin to output the power voltage Vpwr, and controls the boost circuit 203 to directly output the power voltage Vpwr output from the buck circuit 201 to the load LD. On the other hand, when the DC input voltage Vin is lower than the power voltage Vpwr, the control unit 205 controls the buck circuit 201 to directly output the DC input voltage Vin, and controls the boost circuit 203 to perform the boost process to the DC input voltage Vin output from the buck circuit 201, so as to output the power voltage Vpwr to the load LD.

Figure 3:
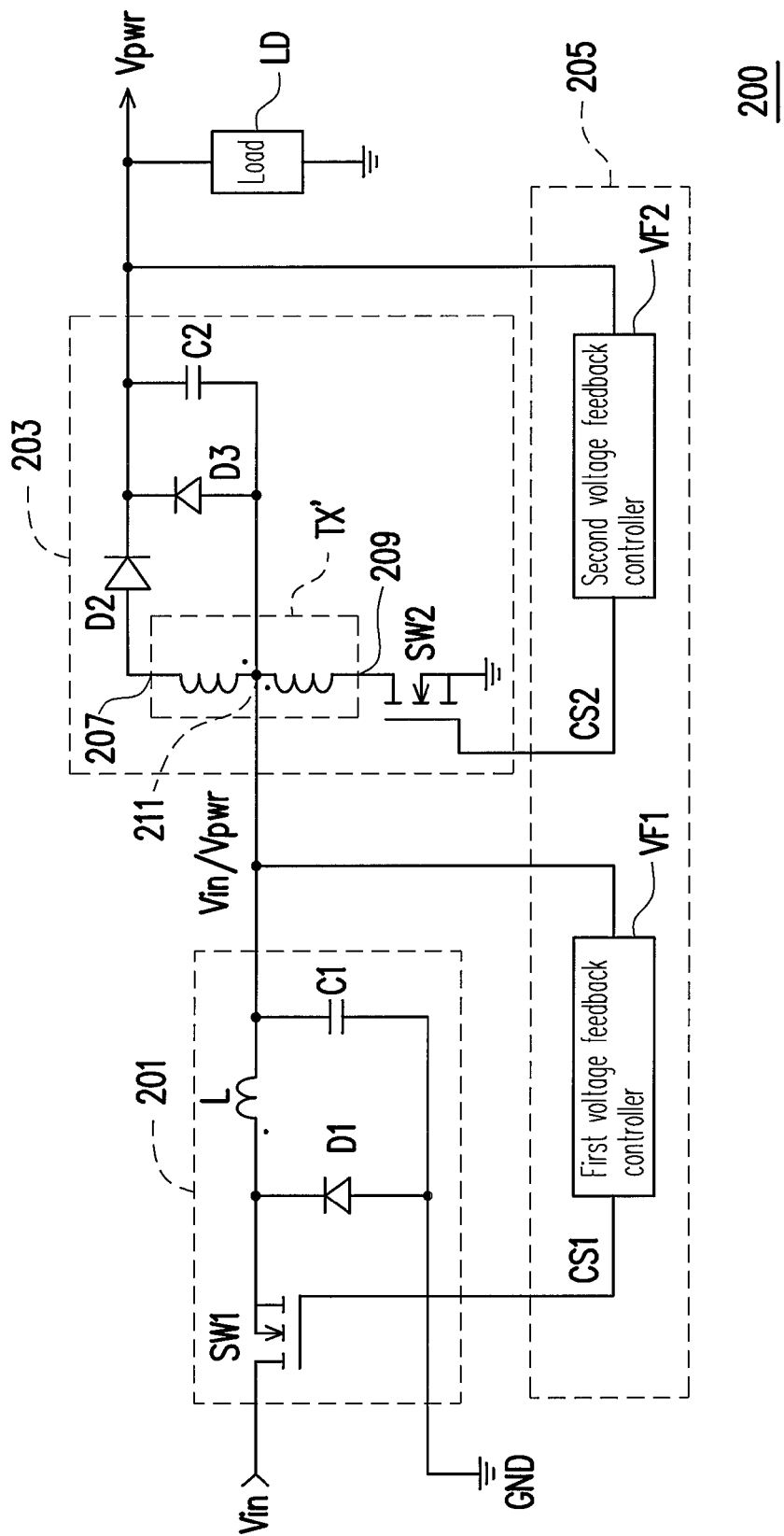
FIG. 3 is a circuit schematic diagram illustrating a DC-to-DC converter according to an embodiment of the present invention.

To be more specific, FIG. 3 is a circuit schematic diagram illustrating the DC-to-DC converter 200 according to an embodiment of the present invention. Referring to FIG. 2 and FIG. 3, the buck circuit 201 is, for example, a buck converter, though the present invention is not limited thereto. The buck circuit 201 includes a switch SW1, a diode D1, an inductor L and a capacitor C1. The switch SW1 can be implemented by a metal oxide semiconductor (MOS) transistor. A first terminal of the switch SW1 is used for receiving the DC input voltage Vin, and a control terminal of the switch SW1 is used for receiving the first control signal CS1. An anode of the diode D1 is coupled to a ground potential GND, and a cathode of the diode D1 is coupled to a second terminal of the switch SW1. A first end of the inductor L is coupled to the second terminal of the switch SW1, and a second end of the inductor L is used for outputting the power voltage Vpwr or the DC input voltage Vin. A first end of the capacitor C1 is coupled to the second end of the inductor L, and a second end of the capacitor C1 is coupled to the ground potential GND.

Moreover, the boost circuit 203 is, for example, a flyback-boost converter, though the present invention is not limited thereto, and the boost circuit 203 includes a transformer TX', diodes D2 and D3, a switch SW2 and a capacitor C2. The transformer TX' has a first terminal 207, a second terminal 209 and a dotting terminal 211. The dotting terminal 211 of the transformer TX' is coupled to the second end of the inductor L. An anode of the diode D2 is coupled to the first terminal 207 of the transformer TX', and a cathode of the diode D2 is used for outputting the power voltage Vpwr. An anode of the diode D3 is coupled to the second end of the inductor L, and a cathode of the diode D3 is coupled to the cathode of the diode D2. The switch SW2 can be implemented by an MOS transistor, and a control terminal of the switch SW2 is used for receiving the second control signal CS2, a first terminal of the switch SW2 is coupled to the second terminal 209 of the transformer TX', and a second terminal of the switch SW2 is coupled to the ground potential GND.

Furthermore, the control unit 205 includes a first voltage feedback controller VF1 and a second voltage feedback controller VF2. The first voltage feedback controller VF1 is used for detecting the output voltage of the buck circuit 201 to generate the first control signal CS1. The second voltage feedback controller VF2 is used for detecting the output voltage of the boost circuit 203 to generate the second control signal CS2.

According to the above descriptions, assuming the power voltage Vpwr required by the load LD is 12V, and the DC input voltage Vin is 12.5V, since the DC input voltage Vin is higher than the power voltage Vpwr, the first voltage feedback controller VF1 generates the first control signal CS1 to repeatedly turn on/off the switch SW1, so that the buck circuit 201 performs the buck process to the DC input voltage Vin (i.e. 12.5V) to output the power voltage Vpwr (i.e. 12V). Now, since the second voltage feedback controller VF2 detects that the output voltage of the boost circuit 203 is the power voltage Vpwr (i.e. 12V) required by the load LD, the second voltage feedback controller VF2 generates the second control signal CS2 to continually turn off the switch SW2, so that the power voltage Vpwr (i.e. 12V) output from the buck circuit 201 can be directly provided to the load LD through the diode D3, namely, the boost circuit 203 can directly output the power voltage Vpwr output from the buck circuit 201 to the load LD.

Therefore, in case of a condition that the DC input voltage Vin is higher than the power voltage Vpwr required by the load LD, only the buck circuit 201 performs the buck process to generate the power voltage Vpwr required by the load LD, and the boost circuit 203 just transmits the power voltage Vpwr generated by the buck circuit 201 to the load LD. Therefore, in case of such condition, the DC-to-DC converter 200 can achieve the buck function and achieve a purpose of improving a buck efficiency.

On the other hand, assuming the power voltage Vpwr required by the load LD is 12V, and the DC input voltage Vin is 11.5V, since the DC input voltage Vin is lower than the power voltage Vpwr, the first voltage feedback controller VF1 generates the first control signal CS1 to continually turn on the switch SW1, so that the buck circuit 201 directly outputs the DC input voltage Vin (i.e. 11.5V). Now, since the second voltage feedback controller VF2 detects that the output voltage of the boost circuit 203 is not the power voltage Vpwr (i.e. 12V) required by the load LD, the second voltage feedback controller VF2 generates the second control signal CS2 to repeatedly turn on/off the switch SW2. Moreover, since one ends of a first side winding and a second side winding of the transformer TX' are overlapped (i.e. the dotting terminal 211), the transformer TX' does not have an isolation function. Therefore, the output power required to be provided by the transformer TX' is not large, so that the boost circuit 203 only performs a low-power boost process to the DC input voltage Vin (i.e. 11.5V) output from the buck circuit 201, so as to generate the power voltage Vpwr (i.e. 12V), and output it to the load LD through the diode D2. In other words, the boost circuit 203 is only required to slightly compensate the inadequate power of the buck circuit 201.

Therefore, in case a condition that the DC input voltage Vin is lower than the power voltage Vpwr required by the load LD, the buck circuit 201 just transmits the received DC input voltage Vin, and only the boost circuit 203 performs the boost process to generate the power voltage Vpwr required by the load LD. Therefore, in case of such condition, the DC-to-DC converter 200 can achieve the boost function and achieve a purpose of improving a boost efficiency. Moreover, in the present embodiment, if the output power of the boost circuit 203 is designed to be far less than the output power of the buck circuit 201 (for example, the output power of the boost circuit 203 is designed to be about 10% of the output power of the buck circuit 201, but not limited thereto), a size of the transformer TX' applied in the boost circuit 203 can be greatly reduced (relative to a size of the transformer TX of the DC-to-DC converter 100 of the related art), so as to miniaturize a size of the DC-to-DC converter 200, and accordingly the DC-to-DC converter 200 can be easily implemented in designs of current miniaturized electronic devices. On the other hand, in the other embodiments of the present invention, the output power of the boost circuit 203 can also be designed to be greater than or equal to the output power of the buck circuit 201, so as to cope with certain design requirements.

In summary, in the DC-to-DC converter of the present invention, the buck circuit and the boost circuit are independently designed, and are used in collaboration to achieve purposes of boost/buck function, small size and high efficiency, etc. To be more specific, in case that the DC input voltage is higher than the power voltage required by the load, since only the buck circuit performs the buck process to generate the power voltage required by the load, and the boost circuit just transmits the power voltage generated by the buck circuit to the load, the DC-to-DC converter can achieve the buck function and achieve a purpose of improving the buck efficiency.

On the other hand, in case that the DC input voltage is lower than the power voltage required by the load, since the buck circuit just transmits the received DC input voltage, and only the boost circuit performs the boost process to generate the power voltage required by the load, the DC-to-DC converter can achieve the boost function and achieve a purpose of improving the boost efficiency. Moreover, if the output power of the boost circuit is designed to be far less than the output power of the buck circuit, the size of the transformer applied in the boost circuit can be greatly reduced, so as to miniaturize the size of the DC-to-DC converter.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A direct current DC-to-DC converter adapted for generating a power voltage required by a load, and the DC-to-DC converter comprising:

a buck circuit for receiving a DC input voltage, and performing a buck process to the DC input voltage according to a first control signal, the buck circuit includes an inductor having a first end coupled to a first switch and a first diode, and a second end outputting the power voltage or the DC input voltage; and a boost circuit coupled to the load and the buck circuit, the boost circuit is for receiving the power voltage or the DC input voltage output from the buck circuit, and performing a boost process to the DC input voltage output from the buck circuit according to a second control signal, the boost circuit includes a transformer only having a first terminal, a second terminal and a dotting terminal, the first terminal is coupled to the load through a second diode, the second terminal is coupled to a second switch and the dotting terminal is coupled between the second end of the inductor and the load through a third diode, wherein when the DC input voltage is higher than the power voltage required by the load, only the buck circuit performs the buck process to generate the power voltage, and the boost circuit directly transmits the power voltage to the load, wherein when the DC input voltage is lower than the power voltage required by the load, the buck circuit directly transmits the DC input voltage to the boost circuit, and only the boost circuit performs the boost process to generate the power voltage to the load.

2. The DC-to-DC converter as claimed in claim 1, further comprising:

a control unit coupled to the buck circuit and the boost circuit, for detecting output voltages of the buck circuit and the boost circuit, so as to generate the first control signal and the second control signal to control the buck circuit and the boost circuit.

3. The DC-to-DC converter as claimed in claim 1, wherein an output power of the boost circuit is less than an output power of the buck circuit.

4. The DC-to-DC converter as claimed in claim 1, wherein an output power of the boost circuit is greater than an output power of the buck circuit.

5. The DC-to-DC converter as claimed in claim 1, wherein an output power of the boost circuit is substantially equal to an output power of the buck circuit.

6. The DC-to-DC converter as claimed in claim 1, wherein the load at least comprises an electronic device.

7. The DC-to-DC converter as claimed in claim 2, wherein the buck circuit comprises:

the first switch having a first terminal receiving the DC input voltage, and a control terminal receiving the first control signal;

the first diode having an anode coupled to a ground potential, and a cathode coupled to a second terminal of the first switch;

the inductor having the first end coupled to the second terminal of the first switch; and a first capacitor having a first end coupled to the second end of the inductor, and a second end coupled to the ground potential.

8. The DC-to-DC converter as claimed in claim 3, wherein the output power of the boost circuit is substantially equal to be 10% of the output power of the buck circuit.

9. The DC-to-DC converter as claimed in claim 7, wherein the buck circuit is a buck converter.

10. The DC-to-DC converter as claimed in claim 7, wherein the boost circuit comprises:

the second diode having an anode coupled to the first terminal of the transformer, and a cathode outputting the power voltage;

the third diode having an anode coupled to the second end of the inductor, and a cathode coupled to the cathode of the second diode; and the second switch having a control terminal receiving the second control signal, a first terminal coupled to the second terminal of the transformer, and a second terminal coupled to the ground potential.

11. The DC-to-DC converter as claimed in claim 10, wherein the control unit comprises:

a first voltage feedback controller for detecting the output voltage of the buck circuit to generate the first control signal; and a second voltage feedback controller for detecting the output voltage of the boost circuit to generate the second control signal.

12. The DC-to-DC converter as claimed in claim 10, wherein the boost circuit is a flyback-boost converter.

13. The DC-to-DC converter as claimed in claim 11, wherein when the DC input voltage is higher than the power voltage, the first voltage feedback controller generates the first control signal to repeatedly turn on/off the first switch, so that the buck circuit performs the buck process to the DC input voltage to output the power voltage.

14. The DC-to-DC converter as claimed in claim 11, wherein when the DC input voltage is lower than the power voltage, the first voltage feedback controller generates the first control signal to continually turn on the first switch, so that the buck circuit directly outputs the DC input voltage.

15. The DC-to-DC converter as claimed in claim 13, wherein when the DC input voltage is higher than the power voltage, the second voltage feedback controller generates the second control signal to continually turn off the second switch, so that the boost circuit directly outputs the power voltage output from the buck circuit to the load.

16. The DC-to-DC converter as claimed in claim 14, wherein when the DC input voltage is lower than the power voltage, the second voltage feedback controller generates the second control signal to repeatedly turn on/off the second switch, so that the boost circuit performs the boost process to the DC input voltage output from the buck circuit to output the power voltage to the load.

17. A direct current DC-to-DC converter adapted for generating a power voltage required by a load, and the DC-to-DC converter comprising:

a buck circuit for receiving a DC input voltage, and performing a buck process to the DC input voltage according to a first control signal, the buck circuit includes an inductor having a first end coupled to a first switch and a first diode, and a second end outputting the power voltage or the DC input voltage;

a boost circuit coupled to the load and the buck circuit, the boost circuit is for receiving the power voltage or the DC input voltage output from the buck circuit, and performing a boost process to the DC input voltage output from the buck circuit according to a second control signal, the boost circuit includes a transformer only having a first terminal, a second terminal and a dotting terminal, the first terminal is coupled to the load through a second diode, the second terminal is coupled to a second switch and the dotting terminal is coupled between the second end of the inductor and the load through a third diode; and a control unit coupled to the buck circuit and the boost circuit, for detecting output voltages of the buck circuit and the boost circuit, and respectively comparing the power voltage required by the load with the DC input voltage and the output voltage of the boost circuit, so as to generate the first control signal and the second control signal to control only one of the buck circuit and the boost circuit for performing the corresponding process.

\* \* \* \* \*